United States Patent
Park et al.

(10) Patent No.: US 11,943,023 B2
(45) Date of Patent: Mar. 26, 2024

(54) METHOD FOR CONTROLLING PLURALITY OF ANTENNA MODULES, AND ELECTRONIC DEVICE THEREFOR

(71) Applicant: SAMSUNG ELECTRONICS CO., LTD., Suwon-si (KR)

(72) Inventors: Daehee Park, Suwon-si (KR); Dongil Son, Suwon-si (KR); Jungmin Park, Suwon-si (KR); Chonghwa Seo, Suwon-si (KR); Hyoungjoo Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 117 days.

(21) Appl. No.: 17/539,483

(22) Filed: Dec. 1, 2021

(65) Prior Publication Data

US 2022/0094408 A1    Mar. 24, 2022

Related U.S. Application Data

(63) Continuation of application No. PCT/KR2020/007285, filed on Jun. 4, 2020.

(30) Foreign Application Priority Data

Jun. 5, 2019  (KR) .................. 10-2019-0066698

(51) Int. Cl.
*H04B 7/06* (2006.01)
*H04W 16/28* (2009.01)
*H01Q 3/34* (2006.01)

(52) U.S. Cl.
CPC ......... *H04B 7/0617* (2013.01); *H04B 7/0691* (2013.01); *H04B 7/0695* (2013.01); *H04W 16/28* (2013.01); *H01Q 3/34* (2013.01)

(58) Field of Classification Search
CPC .............. H04B 7/0617; H04B 7/0691; H04B 7/0695; H01Q 3/34; H01Q 3/36; H04W 16/28
See application file for complete search history.

(56) References Cited

U.S. PATENT DOCUMENTS 9,258,629 B2    2/2016  Graves et al.
2014/0199952 A1  7/2014  Sandhu et al.
(Continued)

FOREIGN PATENT DOCUMENTS

JP      3-245605       11/1991
KR   10-2012-0081297    7/2012
(Continued)

OTHER PUBLICATIONS

Korean Office Action dated Aug. 1, 2023 in corresponding Korean Patent Application No. 10-2019-0066698.
(Continued)

*Primary Examiner* — Rahel Guarino
(74) *Attorney, Agent, or Firm* — Nixon & Vanderhye P.C.

(57) ABSTRACT

Various embodiments of the present disclosure relate to a method of operating an electronic device comprising: identifying that a first antenna module among a plurality of antenna modules is unusable; changing a first beam set of the plurality of antenna modules to a second beam set including at least one sub beam to cover at least a part of the coverage of the first antenna module; and performing communication based on the second beam set.

20 Claims, 18 Drawing Sheets

(56) References Cited

U.S. PATENT DOCUMENTS

2016/0365900 A1   12/2016  Kim et al.
2018/0278309 A1*  9/2018  Raghavan ............ H04B 7/0617
2019/0166536 A1    5/2019  Kim
2019/0392694 A1   12/2019  Funaki et al.

FOREIGN PATENT DOCUMENTS

| KR | 10-2014-0041939 | 4/2014 |
|----|-----------------|--------|
| KR | 10-2015-0106911 | 9/2015 |
| KR | 10-2016-0147499 | 12/2016 |
| KR | 10-2017-0032296 | 3/2017 |
| KR | 10-1723113 | 3/2017 |
| KR | 10-2019-0060259 | 6/2019 |

OTHER PUBLICATIONS

Korean Notice of Patent Grant dated Feb. 1, 2024 for KR Application No. 10-2019-0066698.

* cited by examiner

METHOD FOR CONTROLLING PLURALITY OF ANTENNA MODULES, AND ELECTRONIC DEVICE THEREFOR

CROSS-REFERENCE TO RELATED APPLICATIONS

This application is a continuation of International Application No. PCT/KR2020/007285 designating the United States, filed on Jun. 4, 2020, in the Korean Intellectual Property Receiving Office and claiming priority to Korean Patent Application No. 10-2019-0066698, filed on Jun. 5, 2019, in the Korean Intellectual Property Office, the disclosures of which are incorporated by reference herein in their entireties.

BACKGROUND

Field

The disclosure relates to a method for controlling a plurality of antenna modules and an electronic device therefor.

Description of Related Art

Efforts to develop enhanced $5^{th}$ generation (5G) communication systems or pre-5G communication systems have been ongoing to meet the increasing demand for wireless data traffic since $4^{th}$ generation (4G) communication systems were commercialized. A 5G communication system may use a millimeter wave (mmWave) frequency (for example, 24-86 GH or higher) band to guarantee a wide bandwidth.

Beamforming technology is technology for concentrating energy of signals on a specific direction using a plurality of antennas, and may increase intensity and transmission distance of radio waves through beamforming using a superhigh frequency band In an antenna module performing beamforming in a superhigh frequency band, heat emission may occur due to a plurality of active elements such as power amplifiers and phase shifters or may occur at a radio frequency integrated circuit (RFIC) when transmission/reception of a large amount of data is processed.

Heat emission may reduce the performance of the plurality of active elements, and may cause degradation of effective isotropic radiated power (EIRP) performance of the antenna module. Accordingly, the antenna module that is expected to have heat emission may need to cover its own covering region through another antenna module.

SUMMARY

Embodiments of the disclosure may provide a method for controlling a plurality of antenna modules to cover a region that is covered by an unusable antenna module through another antenna module, and an electronic device therefor.

According to various example embodiments of the disclosure, a method of operating an electronic device may include: identifying that a first antenna module among a plurality of antenna modules is unusable, changing a first beam set of the plurality of antenna modules to a second beam set including at least one sub beam to cover at least part of a coverage of the first antenna module, and performing communication based on the second beam set.

According to various example embodiments of the disclosure, an electronic device may include: a plurality of antenna modules including at least one antenna, a memory and a processor configured to: identify that a first antenna module among the plurality of antenna modules is unusable, change a first beam set of the plurality of antenna modules to a second beam set including at least one sub beam to cover at least part of a coverage of the first antenna module, and control the electronic device to perform communication based on the second beam set.

According to the method and the electronic device therefor according to various example embodiments, the electronic device which communicates through beamforming may detect an optimal beam through at least one other antenna module except for an unusable antenna module when the antenna module is unusable, and may perform communication with respect to a region that is covered by the unusable antenna module.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings.

Figure 1:
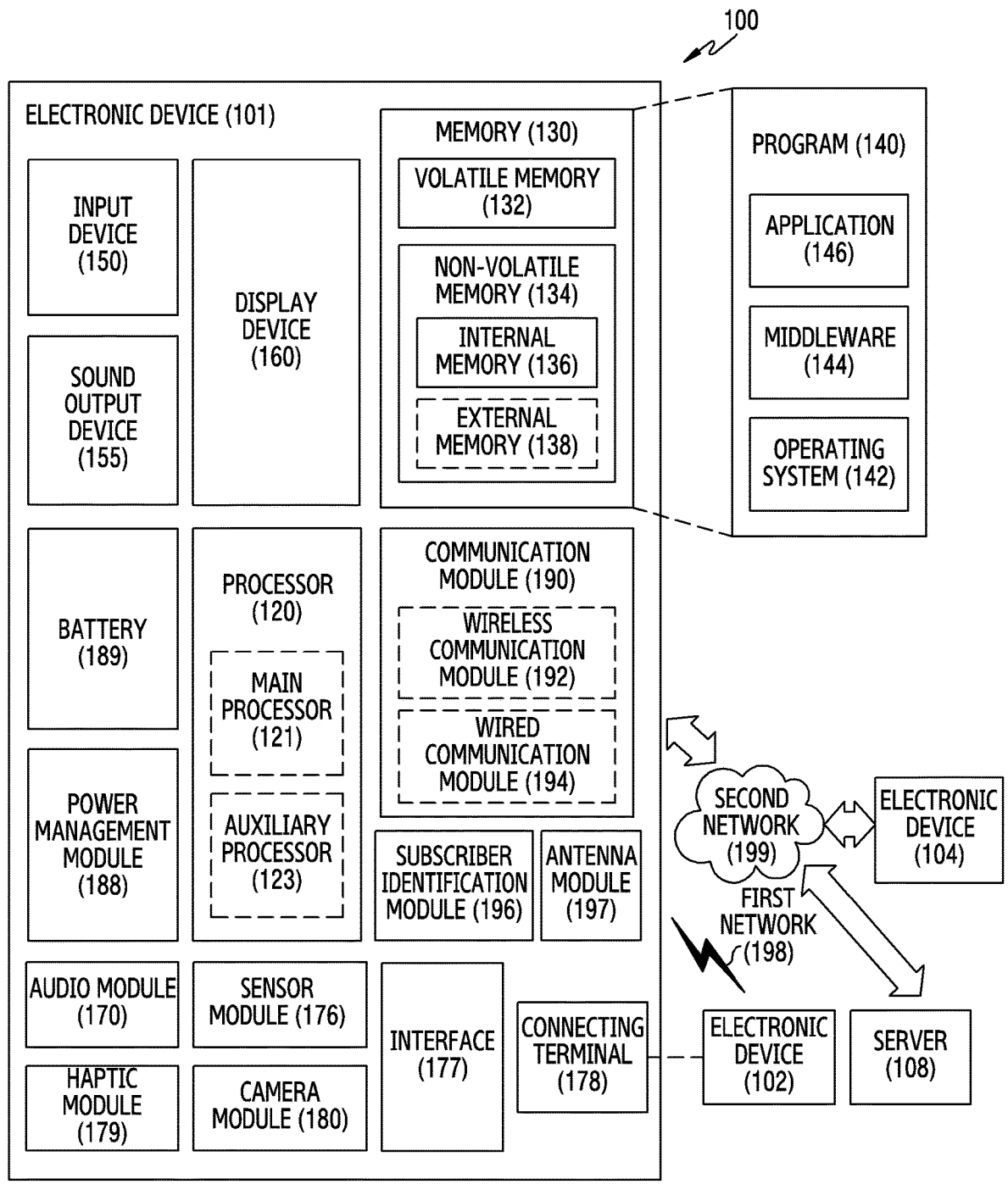
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
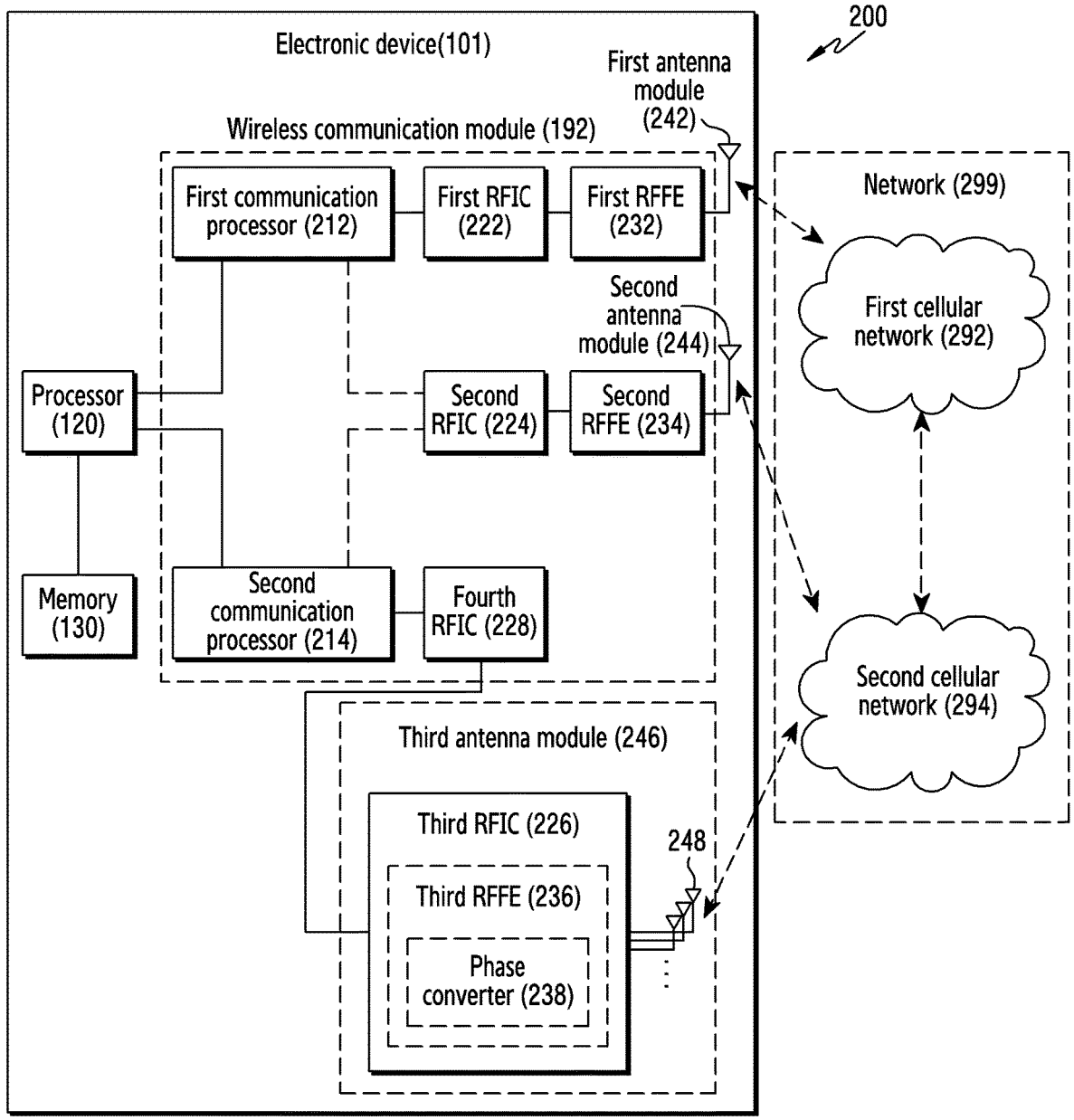
FIG. 2 is a block diagram illustrating an example configuration of an electronic device for supporting legacy network communication and 5G network communication according to various embodiments.

FIG. 2 is a block diagram 200 illustrating an example configuration of an example electronic device 101 in a network environment including a plurality of cellular networks according to various embodiments.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to an embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to an embodiment, the fourth RFIC 228 may be omitted or may be included as a portion of the third RFIC 226.

The first communication processor 212 may include various communication circuitry and can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 may include various communication circuitry and can support establishment of a communication channel corresponding to a designated band (e.g., about 6 GHz~about 60 GHz) of a band to be used for wireless communication with the second cellular network 294 and 5G network communication through the established communication channel. According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, can converts a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Alone (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3:
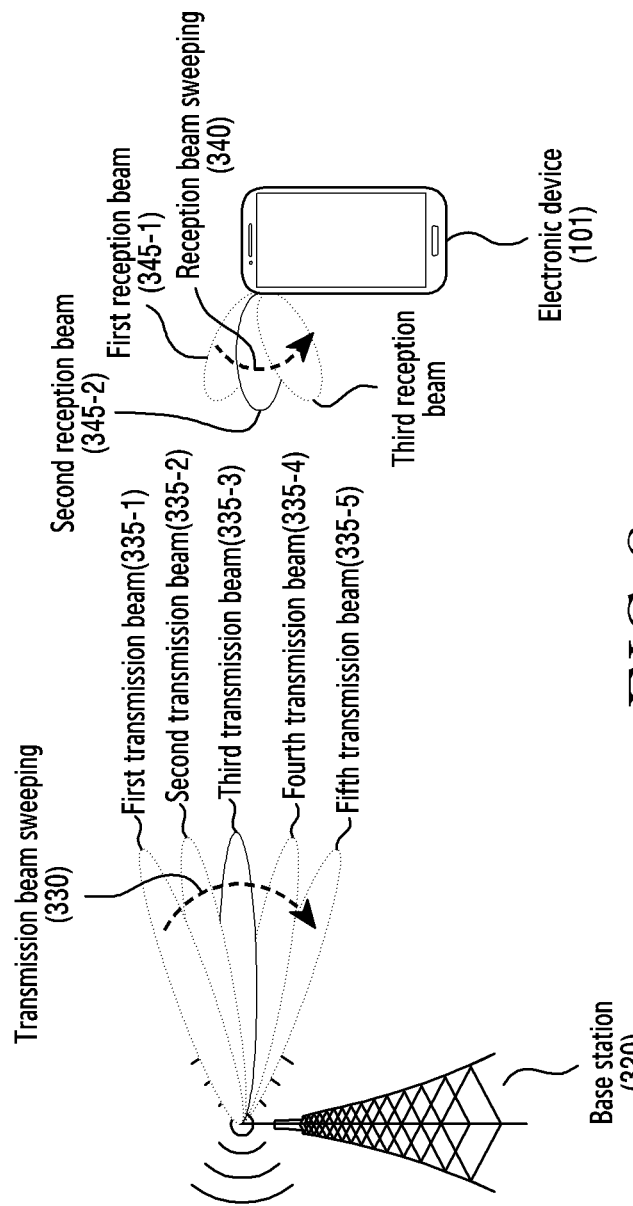
FIG. 3 is a diagram illustrating an example of an operation for connecting wireless communication between a base station and an electronic device in a network that uses directional beams for wireless connection according to various embodiments.

FIG. 3 is a diagram illustrating an example operation for connecting wireless communication between a base station 320 and an electronic device 101 in a network using directional beams for wireless connection according to various embodiments. According to an embodiment, the base station (gNB(gNodeB), a transmission reception point (TRP)) 320 may perform a beam detection operation with the electronic device 101 to connect the wireless communication. In the illustrated embodiment, to achieve the beam detection, the base station 320 may perform transmission beam sweeping 330 at least one time by transmitting a plurality of transmission beams, for example, first to fifth transmission beams 335-1 to 335-5 of different directions, in sequence.

According to an embodiment, the first to fifth transmission beams 335-1 to 335-5 may include at least one synchronization sequences (SS)/physical broadcast channel (PBCH) block (SS/PBCH Block). The SS/PBCH Block may be used to periodically measure a channel of the electronic device 110 or beam intensity.

In an embodiment, the first to fifth transmission beams 335-1 to 335-5 may include at least one channel state information-reference signal (CSI-RS). The CSI-RS may be a criterion/reference signal flexibly set by the base station 320, and may be transmitted periodically/semi-persistently or aperiodically. The electronic device 101 may measure the channel, beam intensity using the CSI-RS.

According to an embodiment, the transmission beams may form a radiation pattern having a selected beam width. For example, the transmission beams may have a broad radiation pattern having a first beam width, or a sharp radiation pattern having a second beam width which is narrower than the first beam width. For example, the transmission beams including the SS/PBCH Block may have a broader radiation pattern than that of the transmission beams including the CSI-RS.

According to an embodiment, the electronic device 101 may perform reception beam sweeping 340 while the base station 320 is performing the transmission beam sweeping 330. For example, the electronic device 101 may fix a first reception beam 345-1 in a first direction and may receive a signal of the SS/PBCH Block transmitted with at least one of the first to fifth transmission beams 335-1 to 335-5 while the base station 220 is performing the first transmission beam sweeping 330. The electronic device 101 may fix a second reception beam 345-2 in a second direction and may receive a signal of the SS/PBCH Block transmitted with the first to fifth transmission beams 335-1 to 335-5 while the base station 320 is performing the second transmission beam sweeping 330. As described above, the electronic device 101 may select a reception beam (for example, the second reception beam 345-2) and a transmission beam (for example, the third transmission beam 335-3) that enable communication, based on a result of receiving a signal through the reception beam sweeping 340.

According to an embodiment, when the transmission and reception beams that enable communication are determined as described above, the base station 320 and the electronic device 101 may transmit and/or receive basic information of setting a cell, and may set information of additional beam management based on the basic information. For example, the beam management information may include detailed information on the set beam, setting information regarding the SS/PBCH Block, CSI-RS or additional reference signal.

According to an embodiment, the electronic device 101 may continuously monitor the channel and the beam intensity using at least one of the SS/PBCH Block, the CSI-RS included in the transmission beams. The electronic device 101 may adaptively select a beam having good beam quality using the monitoring operation. Selectively, when communication is disconnected due to movement of the electronic device 101 or interruption of the beams, the electronic device may perform the above-described beam sweeping operation again and may determine a beam for communication.

Figure 4:
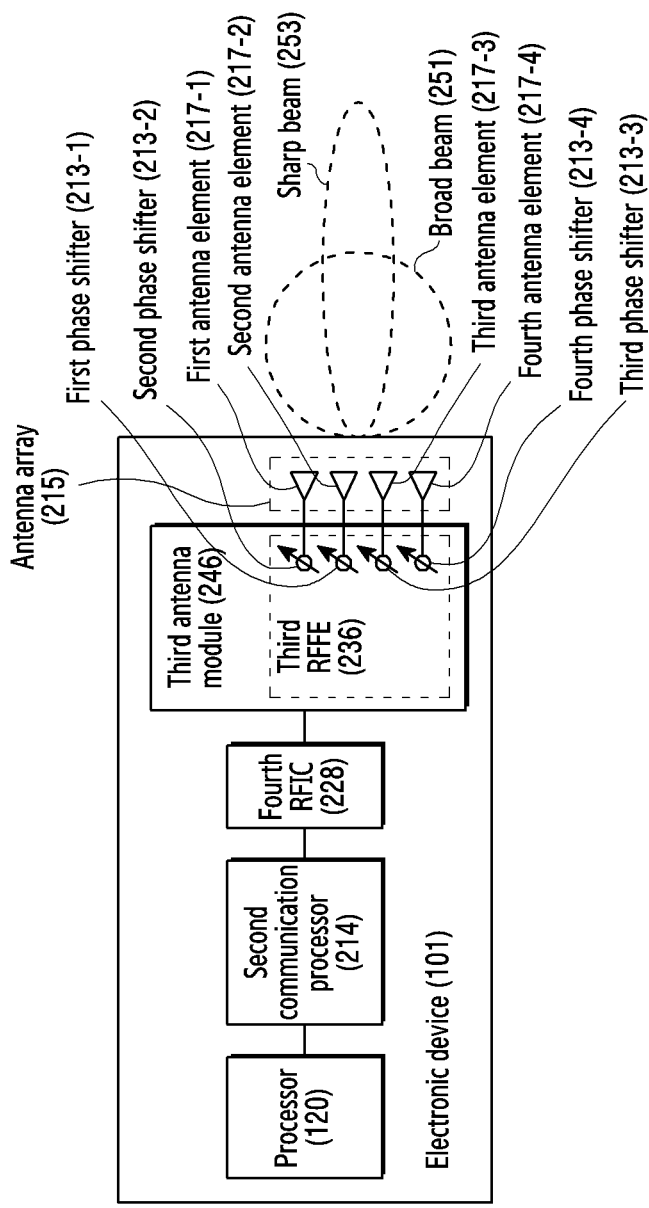
FIG. 4 is a block diagram illustrating an example configuration of an electronic device for $5^{th}$ generation (5G) network communication according to various embodiments.

FIG. 4 is a block diagram illustrating an example configuration of an electronic device 101 for 5G network communication according to various embodiments. The electronic device 101 may include various components shown in FIG. 4, but for brief explanation, FIG. 4 illustrates that the electronic device includes a processor (e.g., including processing circuitry) 120, a second communication processor (e.g., including processing circuitry) 214, a fourth RFIC 228, at least one third antenna module 246. For example, the processor 120 may be an application processor (AP), and the second communication processor 214 may be a modulator-demodulator (MODEM).

Referring to FIG. 4, the third antenna module 246 may include first to fourth phase shifters 213-1 to 213-4, and/or first to fourth antenna elements 217-1 to 217-4. Each one of the first to fourth antenna elements 217-1 to 217-4 may be electrically connected with individual one of the first to fourth phase shifters 213-1 to 213-4. The first to fourth antenna elements 217-1 to 217-4 may form at least one antenna array 215.

According to an embodiment, the second communication processor 214 may control phases of signals transmitted and/or received through the first to fourth antenna elements 217-1 to 217-4, by controlling the first to fourth phase shifters 213-1 to 213-4, and accordingly, may generate a transmission beam and/or a reception beam in a selected direction.

According to an embodiment, the third antenna module 246 may form a beam 251 of a broad radiation pattern (hereinafter, a "broad beam") or a beam 253 of a sharp radiation pattern (hereinafter, a "sharp beam") mentioned above, according to the number of antenna elements used. For example, the third antenna module 246 may form the sharp beam 253 when all of the first to fourth antenna elements 217-1 to 217-4 are used, and may form the broad beam 251 when only the first antenna element 217-1 and the second antenna element 217-2 are used. Since the broad beam 251 has a wider coverage than the sharp beam 253 but has a lower antenna gain, the broad beam 251 may be more effective in beam detection. On the other hand, since the sharp beam 253 has a narrower coverage than the broad beam 251 but has a higher antenna gain, the sharp beam 253 can enhance communication performance.

According to an embodiment, the second communication processor 214 may utilize a sensor module 176 (for example, a nine-axis sensor, a grip sensor, or a GPS) for beam detection. For example, the electronic device 101 may adjust a beam detection position and/or a beam detection period based on a position and/or movement of the electronic device 101 using the sensor module 176. In another example, when the electronic device 101 is gripped by a user, an antenna module having better communication performance may be selected from the plurality of third antenna modules 246 by identifying a part gripped by the user.

According to various embodiments, an intermediate frequency integrated circuit (IFIC) (not shown) included in the electronic device 101 may convert a baseband signal of the second communication processor 214 into an interband signal, and a radio frequency integrated circuit (RFIC) mounted in the third antenna module 246 may convert an intermediate frequency (IF) into a target frequency band (for example, 28 GHz, 39 GHz).

According to various embodiments, the processor 120 and the second communication processor 214 may be one component, or the IFIC (not shown) and the third RFIC 226 may be one component, and the third RFIC 226 and the third antenna module 246 may be separated as other components.

Figure 5:
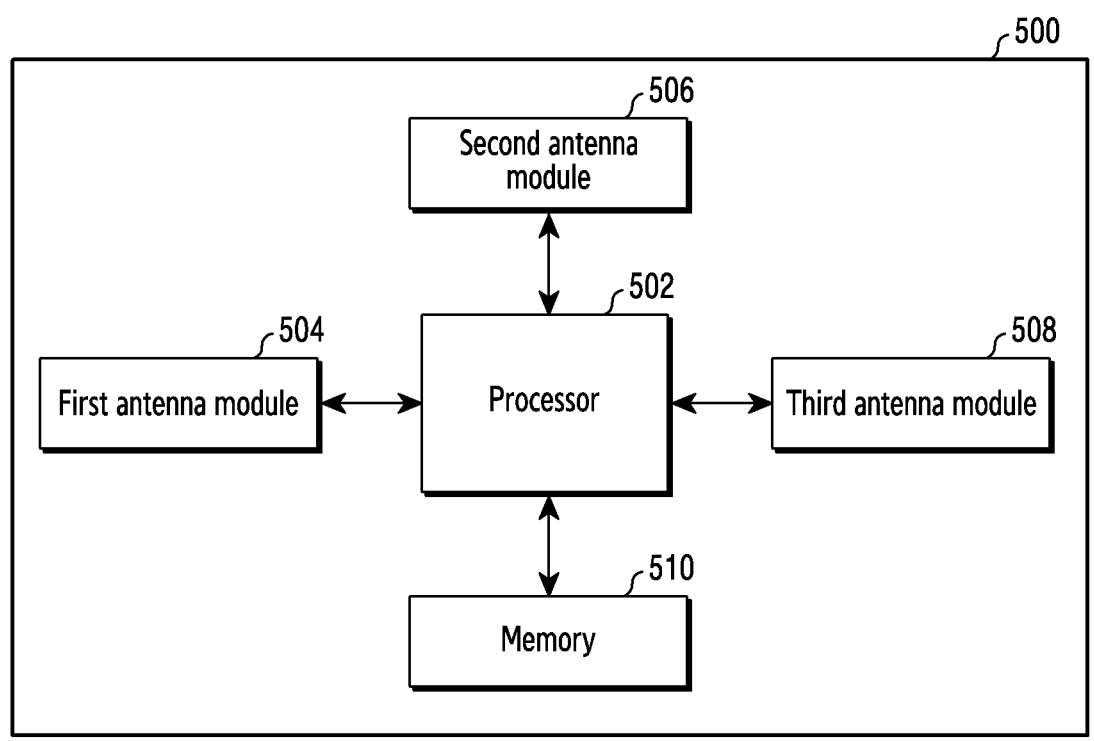
FIG. 5 is a block diagram illustrating an example configuration of an electronic device for controlling a plurality of antenna modules according to various embodiments.

FIG. 5 is a block diagram illustrating an example configuration of an electronic device 500 for controlling a plurality of antenna modules according to various embodiments.

Referring to FIG. 5, the electronic device 500 according to an embodiment may include a plurality of antenna modules, and the number of the plurality of antenna modules is not limited, and for example, the electronic device may include three antenna modules. The electronic device 500 (for example, the electronic device 101 of FIG. 1) may include a processor (e.g., including processing circuitry) 502 (for example, the processor 120 of FIG. 1 and/or the second communication processor of FIG. 2), a first antenna module (e.g., including at least one antenna) 504 (for example, the third antenna module 246 of FIG. 2), a second antenna module (e.g., including at least one antenna) 506, a third antenna module (e.g., including at least one antenna) 508, and/or a memory 510 (for example, the memory 130 of FIG. 1).

According to an embodiment, the processor 502 may include various processing circuitry and control overall operations of the electronic device 500. For example, the processor 502 may control at least one other component (for example, a hardware or software component) connected to the processor 502, and may perform various data processing or computation. According to an embodiment, the processor 502 may load a command or data received from another component into the memory as at least part of the data processing or computation, and may process the command or data stored in the memory and may store resulting data in the memory. According to an embodiment, the processor 502 may receive state information of the first antenna module 504, the second antenna module 506, and/or the third antenna module 508 in the electronic device 500, and may activate at least one antenna module of the first antenna module 504, the second antenna module 506, or the third antenna module 508 based on the state information. The processor 502 may control to perform beam sweeping with respect to the at least one activated antenna module, and may determine a beam of the strongest signal strength based on the beam sweeping. The processor 502 may set a beam that each of the antenna modules has, by changing a register value of a phase shifter included in each of the antenna modules. The processor 502 may pre-store a setting value of the phase shifter in the memory 510 to set a beam that each of the antenna modules has.

In various embodiments of the disclosure, the beam sweeping controlled by the processor 502 may be variable. For example, the processor 502 may change an order of beams for beam sweeping. In addition, the processor 502 may control to skip at least one beam of a beam set of performing beam sweeping, and to perform beam sweeping.

According to an embodiment, the first antenna module 504, the second antenna module 506, or the third antenna module 508 may each include at least one antenna and perform communication with a base station through beams in respective directions of the electronic device 500. The first antenna module 504, the second antenna module 506, or the third antenna module 508 may have at least one beam. For example, the first antenna module 504, the second antenna module 506 or the third antenna module 508 may include a plurality of active elements such as a phase shifter or a power amplifier, a plurality of antenna elements and/or an RFIC. The first antenna module 504, the second antenna module 506, or the third antenna module 508 may control phases of signals transmitted and/or received through the plurality of antenna elements, by controlling the plurality of phase shifters, and accordingly, may generate a transmission beam and/or a reception beam in a selected direction. According to an embodiment, the antenna module may form a beam of a broad radiation pattern or a beam of a sharp radiation pattern according to the number of antenna elements. Since the broad beam (for example, the broad beam 251 of FIG. 4) has a wider coverage than the sharp beam (for example, the sharp beam 253 of FIG. 4), but has a lower antenna gain, the broad beam may be more effective in beam detection. On the other hand, since the sharp beam has a narrower coverage than the broad beam, but has a higher antenna gain, the sharp beam can enhance communication performance.

According to an embodiment, the memory 510 may store various data used by at least one component (for example, the processor 502) of the electronic device 500. The data may include, for example, state information of each of the plurality of antenna modules (for example, the first antenna module 504, the second antenna module 506, and the third antenna module 508), beam set information regarding the plurality of antenna modules, information of an optimal beam determined through beam sweeping, and input data or output data related to a relevant command.

Figure 6A:
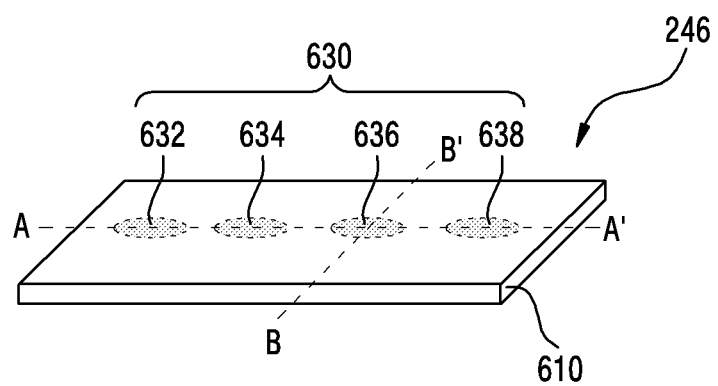
FIGS. 6A, 6B and 6C are diagrams illustrating an example structure of a third antenna module according to various embodiments.
Figure 6B:
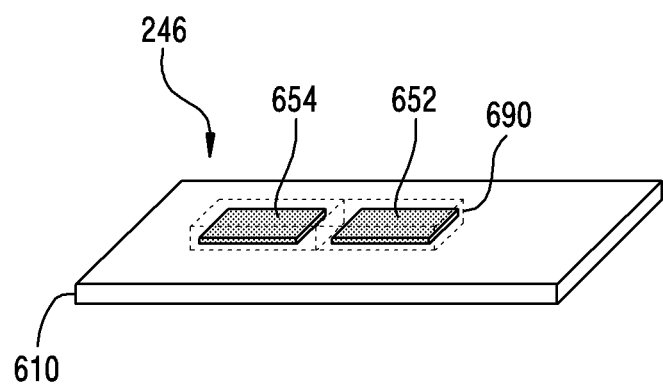
Figure 6C:
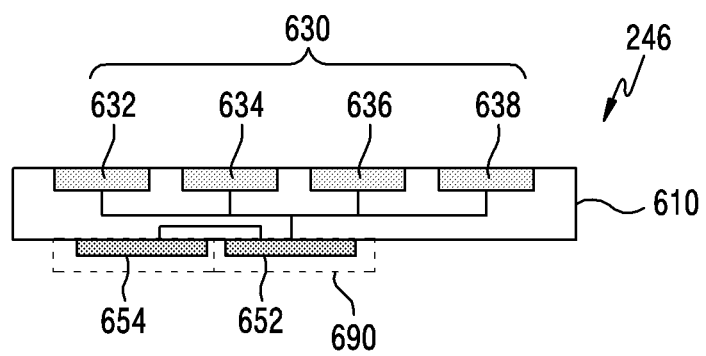

FIGS. 6A, 6B and 6C are diagrams illustrating an example structure of the third antenna module 246 according to various embodiments.

FIG. 6A illustrates an embodiment of a structure of the third antenna module 246 described with reference to FIG. 2, for example. FIG. 6A is a perspective view of the third antenna module 246 seen from one side, and FIG. 6B is a perspective view of the third antenna module 246 seen from the other side. FIG. 6C is a cross-sectional view of the third antenna module 246 taken on line A-A'.

Referring to FIGS. 6A, 6B and 6C, in an embodiment, the third antenna module 246 may include a printed circuit board 610, an antenna array 630, a radio frequency integrate circuit (RFIC) 652, a power manage integrate circuit (PMIC) 654, and a module interface (not shown). Selectively, the third antenna module 246 may further include a shielding member 690. In various embodiments, at least one of the above-mentioned components may be omitted or at least two of the components may be integrally formed with each other.

According to an embodiment, the printed circuit board 610 may include a plurality of conductive layers and a plurality of non-conductive layers which are stacked alternately with the conductive layers. The printed circuit board 610 may provide electric connection between the printed circuit board 610 and/or various electronic components disposed on the outside using wires and conductive vias formed on the conductive layer.

According to an embodiment, the antenna array 630 (for example, the antenna 248 of FIG. 2) may include a plurality of antenna elements 632, 634, 636 or 638 disposed to form directional beams. The antenna elements may be formed, for example, on a first surface of the printed circuit board 610. According to an embodiment, the antenna array 630 may be formed inside the printed circuit board 610. According to embodiments, the antenna array 630 may include a plurality of antenna arrays of the same or different shapes or types (for example, a dipole antenna array and/or a patch antenna array).

According to an embodiment, the RFIC 652 (for example, the third RFIC 226 of FIG. 2) may be disposed on another area (for example, a second surface opposite to the first surface) of the printed circuit board 610 that is spaced apart from the antenna array. The RFIC may be configured to process a signal of a selected frequency band which is transmitted/received through the antenna array 630. According to an embodiment, the RFIC 652 may convert a baseband signal acquired from a communication processor (not shown) into an RF signal of a designated band when transmitting signals. The RFIC 652 may convert an RF signal received through the antenna array 630 into a baseband signal when receiving signals, and may transmit the baseband signal to the communication processor.

According to an embodiment, the RFIC 652 may up-convert an IF signal (for example, about 9 GHz to about 11 GHz) acquired from an intermediate frequency integrate circuit (IFIC) (for example, the fourth RFIC 228 of FIG. 2) into an RF signal of a selected band when transmitting signals. The RFIC 652 may down-convert an RF signal acquired through the antenna array 630 into an IF signal when receiving signals, and may transmit the IF signal to the IFIC.

According to an embodiment, the PMIC 654 may be disposed on another area (for example, the second surface) of the printed circuit board 610 spaced apart from the antenna array. The PMIC may receive a voltage from a main PCB (not shown), and may provide necessary power to various components (for example, the RFIC 652) on the antenna module.

According to an embodiment, the shielding member 690 may be disposed on part (for example, the second surface) of the printed circuit board 610 to electromagnetically shield at least one of the RFIC 652 or the PMIC 654. According to an embodiment, the shielding member 690 may include a shield can.

In various embodiments, the third antenna module 246 may be electrically connected with another printed circuit board (for example, a main circuit board) through the module interface although this is not illustrated in the drawing. The module interface may include a connection member, for example, a coaxial cable connector, a board-to-board connector, an interposer, or a flexible printed circuit board (FPCB). The RFIC 652 and/or the PMIC 654 of the antenna module may be electrically connected with the printed circuit board through the connection member.

Figure 7:
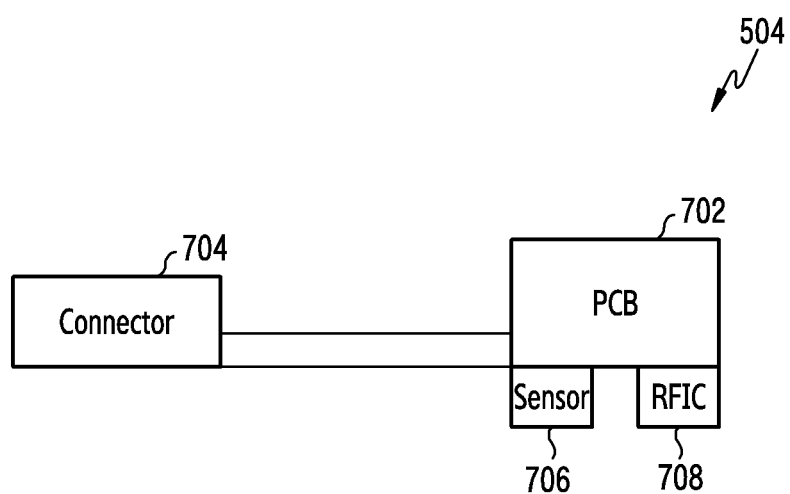
FIG. 7 is a block diagram illustrating an example configuration of an antenna module included in an electronic device according to various embodiments.

FIG. 7 is a block diagram illustrating an example configuration of an antenna module included in the electronic device 500 according to various embodiments. The first antenna module 504 may include various components, and is illustrated in FIG. 7 as including a printed circuit board (PCB) 702 (for example, the printed circuit board 610 of FIG. 6), a connector 704, a sensor 706 and/or a radio frequency integrated circuit (RFIC) 708 (for example, the third RFIC 226 of FIG. 2) for brief explanation.

Referring to FIG. 7, the PCB 702 according to an embodiment may be a board that configures an electronic circuit to connect an electronic component such as a resistor, a condenser, or an integrated circuit. The connector 704 may connect the PCB 703 and a main PCB. The sensor 706 may detect an operation state (for example, power or temperature) of the first antenna module 504, and may generate an electric signal or a data value corresponding to the detected state. According to an embodiment, the sensor 706 may include, for example, a grip sensor and/or a temperature sensor. The RFIC 708 may be an RF circuit that is implemented on one semiconductor chip using an active element and a passive element. For example, the sensor 706 mounted on the first antenna module 504 may measure a temperature of the first antenna module 504, and may transmit data regarding the measured temperature to the processor 502.

In various embodiments, the sensor 706 may be included in other components than the antenna module 504 or may be included as a separate component in the electronic device 500.

According to various example embodiments, an electronic device 500 (for example, the electronic device 101 of FIG. 1) may include: a plurality of antenna modules, each including at least one antenna; a memory (for example, the memory 130 of FIG. 1); and a processor (for example, the processor 120 of FIG. 1 and/or the second communication processor 214 of FIG. 2), and the processor may be configured to: identify that a first antenna module (for example, the first antenna module 504 of FIG. 5) among the plurality of antenna modules (for example, the first antenna module 504 of FIG. 5, the second antenna module 506 of FIG. 5, the third antenna module 508 of FIG. 5) is unusable; change a first beam set of the plurality of antenna modules to a second beam set including at least one sub beam to cover at least part of a coverage of the first antenna module; and control the electronic device to perform communication based on the second beam set.

According to various example embodiments, the at least one sub beam may include a beam of a usable antenna module among the plurality of antenna modules that covers at least part of the coverage of at least one antenna module identified as being unusable among the plurality of antenna modules.

According to various example embodiments, the processor may be configured to receive information regarding a temperature of each of the plurality of antenna modules from the plurality of antenna modules, and determine whether the temperature of each of the plurality of antenna modules exceeds a specified first threshold value, based on the information regarding the temperature.

According to various example embodiments, the processor may be configured to identify that the first antenna module is usable; change the second beam set to the first beam set, and control the electronic device to perform communication based on the first beam set, wherein the first beam set may be configured as a plurality of main beams of the respective plurality of antenna modules.

According to various example embodiments, the processor may be configured to determine whether a temperature of the first antenna module is less than a specified second threshold value, based on the information regarding the temperature.

According to various example embodiments, the plurality of main beams may have a higher effective isotropic radiated power (EIRP) gain with respect to a specific coverage than the at least one sub beam.

According to various example embodiments, the processor may be configured to control the electronic device to: perform beam sweeping based on the first beam set; and perform communication using a beam determined based on the beam sweeping.

According to various example embodiments, the first threshold value may be larger than the second threshold value.

According to various example embodiments, the processor may be configured to control the electronic device to: perform beam sweeping based on the second beam set, and perform communication using a beam determined based on the beam sweeping.

According to various example embodiments, the second beam set may correspond to a beam table in which a value of a beam of each of the plurality of antenna modules optimized for a coverage of another antenna module is pre-stored.

Figure 8:
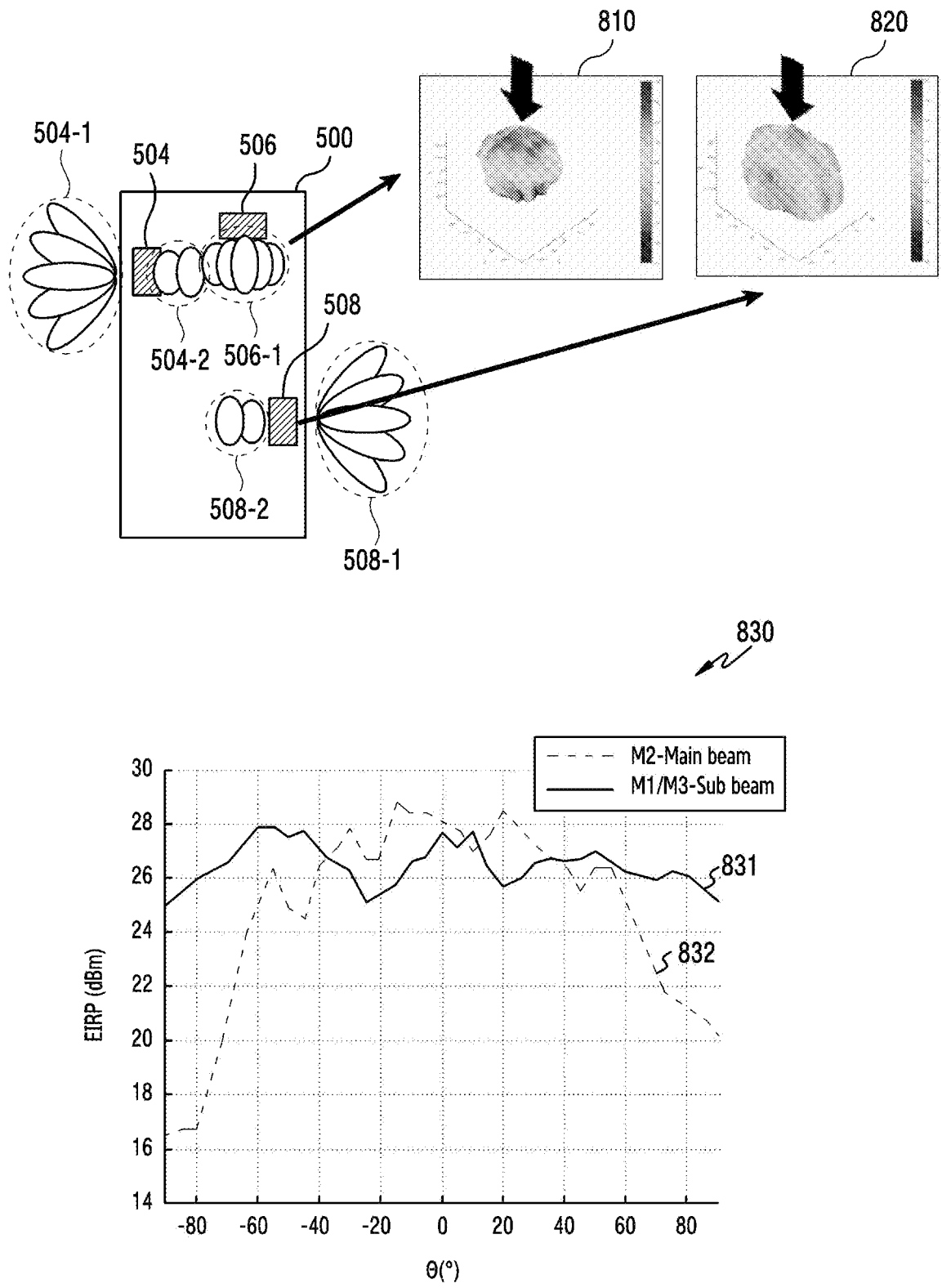
FIG. 8 is a diagram and graph illustrating a comparison of a radiation pattern of a main beam of an antenna module and a radiation pattern of a sub beam of another antenna module according to various embodiments.

FIG. 8 is a graph and diagram illustrating comparison of a radiation pattern of a main beam of an antenna module and a radiation pattern of a sub beam of another antenna module according to various embodiments. An electronic device 500 illustrated in FIG. 8 may include a first antenna module 504 which manages a main beam 504-1 and a sub beam 504-2, a second antenna module 506 which manages a main beam 506-1 without managing a sub beam, and a third antenna module 508 which manages a main beam 508-1 and a sub beam 508-2.

Referring to FIG. 8, each of the first antenna module 504, the second antenna module 506, and the third antenna module 508 according to an embodiment may perform communication using at least one main beam 504-1, 506-1, 508-1 facing their respective coverage regions. For example, the first antenna module 504 may cover a left region of the electronic device 500 using at least one main beam 504-1. The second antenna module 506 may cover an upper region of the electronic device 500 using at least one main beam 506-1. The third antenna module 508 may cover a right region of the electronic device 500 using at least one main beam 508-1. The left region of the electronic device 500 may be covered using at least one sub beam 508-2 of the third antenna module 508, in addition to the at least one main beam 504-1 of the first antenna module 504. The upper region of the electronic device 500 may be covered using at least one sub beam 504-2 of the first antenna module 504 or at least one sub beam 508-2 of the third antenna module 508, in addition to the at least one main beam 506-1 of the second antenna module 506. The right region of the electronic device 500 may be covered using the at least one sub beam 504-2 of the first antenna module 504 in addition to the at least one main beam 508-1 of the third antenna module 508. The main beam may be a beam that has a higher EIRP gain for a specific coverage than a sub beam, and may include a beam of an antenna module facing the specific coverage. For example, at least one main beam for the left region of the electronic device 500 may include a beam of the first antenna module 504. The sub beam may be a beam that has a lower EIRP gain for a specific coverage than a main beam, and may include a beam of another antenna module covering at least part of the specific coverage. For example, at least one sub beam for the left region of the electronic device 500 may include a beam of the second antenna module 506 or a beam of the third antenna module 508.

According to an embodiment, the main beam and the sub beam covering the upper region of the electronic device 500 will be described. In the upper region of the electronic device 500, a radiation pattern 810 of the main beam 506-1 of the second antenna module 506, which covers the upper region of the electronic device 500, may have a narrower beam width than a radiation pattern 820 of the sub beam 504-2 of the first antenna module 504 or the sub beam 508-2 of the third antenna module 508, which covers the upper region of the electronic device 500. Referring to the graph 830 illustrating EIRP regarding the main beam and the sub beam covering the upper region of the electronic device 500 according to angles, in a section from about −40° to about 40°, EIRP 832 of the main beam of the second antenna module 506, which covers the upper region of the electronic device 500, may be higher than EIRP 831 of the sub beam 504-2 of the first antenna module 504 or the sub beam 508-2 of the third antenna module 508, which covers the upper region of the electronic device 500. From the upper region of the electronic device 500 to a side region, there may be a region in which the EIRP 832 of the main beam of the second antenna module 506, which covers the upper region of the electronic device 500, is lower than the EIRP 831 of the sub beam 504-2 of the first antenna module 504 or the sub beam 508-2 of the third antenna module 508, which covers the upper region of the electronic device 500, in a section lower than about −40° or a section exceeding about 40°.

Figure 9:
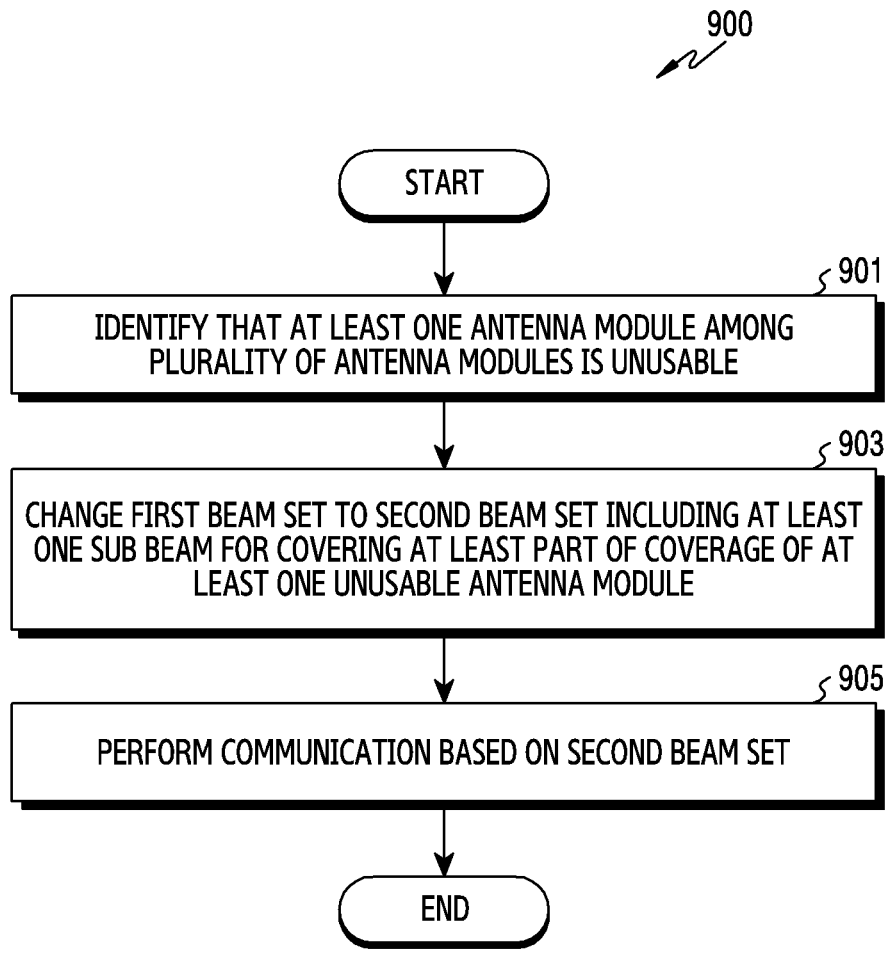
FIG. 9 is a flowchart illustrating an example operation for controlling a plurality of antenna modules in an electronic device when at least one antenna module is unusable according to various embodiments.

FIG. 9 is a flowchart 900 illustrating example operations for controlling a plurality of antenna modules when at least one antenna module is unusable in the electronic device 500 according to various embodiments. An operating entity of the flowchart 900 illustrated in FIG. 9 may be understood as the electronic device 500 or a component (for example, the processor 502) of the electronic device 500.

Referring to FIG. 9, in operation 901, the electronic device 500 according to an embodiment may identify that a certain antenna module among the plurality of antenna modules is unusable. The electronic device 500 may receive state information from the sensor 706 included in each of the plurality of antenna modules. The state information may include information regarding a temperature of the antenna module. For example, the electronic device 500 may receive the state information including the information regarding the temperature of the antenna module from the sensor 706 included in each of the plurality of antenna modules. The electronic device 500 may compare the temperature of each of the plurality of antenna modules and a first threshold value, and may determine an antenna module the temperature of which exceeds the first threshold value as an unusable antenna module.

In various embodiments, the electronic device 500 may identify that at least one antenna module used for current communication among the plurality of antenna modules is unusable. For example, the electronic device 500 may receive state information including information regarding a temperature of at least one antenna module from the sensor 706 included in the at least one antenna module used for current communication among the plurality of antenna modules. The electronic device 500 may compare the temperature of the at least one antenna module used for current communication among the plurality of antenna modules and the first threshold value, and may determine the at least one antenna module the temperature of which exceeds the first threshold value as an unusable antenna module.

In various embodiments, when the sensor is included in other components than the antenna module in the electronic device 500, or is included as a separate component in the electronic device 500, the electronic device 500 may receive state information of each of the plurality of antenna modules from the sensor. For example, the electronic device 500 may receive the state information including information regarding the temperature of each of the plurality of antenna modules from the sensor.

According to an embodiment, in operation 903, the electronic device 500 may change a beam set used for current communication (for example, a beam set used for beam sweeping) from a first beam set of the plurality of antenna modules to a second beam set. The second beam set may be, for example, a beam set that includes at least one sub beam to cover at least part of a coverage of at least one unusable antenna module among the plurality of antenna modules. The first beam set may include at least one main beam for each of the plurality of antenna modules in the electronic device 500. The main beam may be a beam that has a higher EIRP gain with respect to a specific coverage than a sub beam, and may include a beam of an antenna module facing the specific coverage. The second beam set may include at least one sub beam for at least one usable antenna module among the plurality of antenna modules in the electronic device 500, and the sub beam may be a beam that has a lower EIRP gain with respect to a specific coverage than a main beam, and may include a beam of another antenna module that covers at least part of a coverage of an antenna module identified as being unusable. Information regarding the first beam set and/or the second beam set may be pre-stored in the memory 510 of the electronic device 500. For example, the information regarding the first beam set and/or the second beam set may be pre-stored in the memory 510 of the electronic device 500 in the form of a beam table.

According to an embodiment, in operation 905, the electronic device 500 may perform communication based on the second beam set. The electronic device 500 may determine a beam capable of covering the coverage of the antenna module identified as being unusable, based on the second beam set. The electronic device 500 may perform communication using the determined beam. For example, the electronic device 500 may perform beam sweeping based on the beam table including the information regarding the main beam and the sub beam regarding at least one usable antenna module, and may determine an optimal beam to cover the coverage of the antenna module identified as being unusable.

Figure 10A:
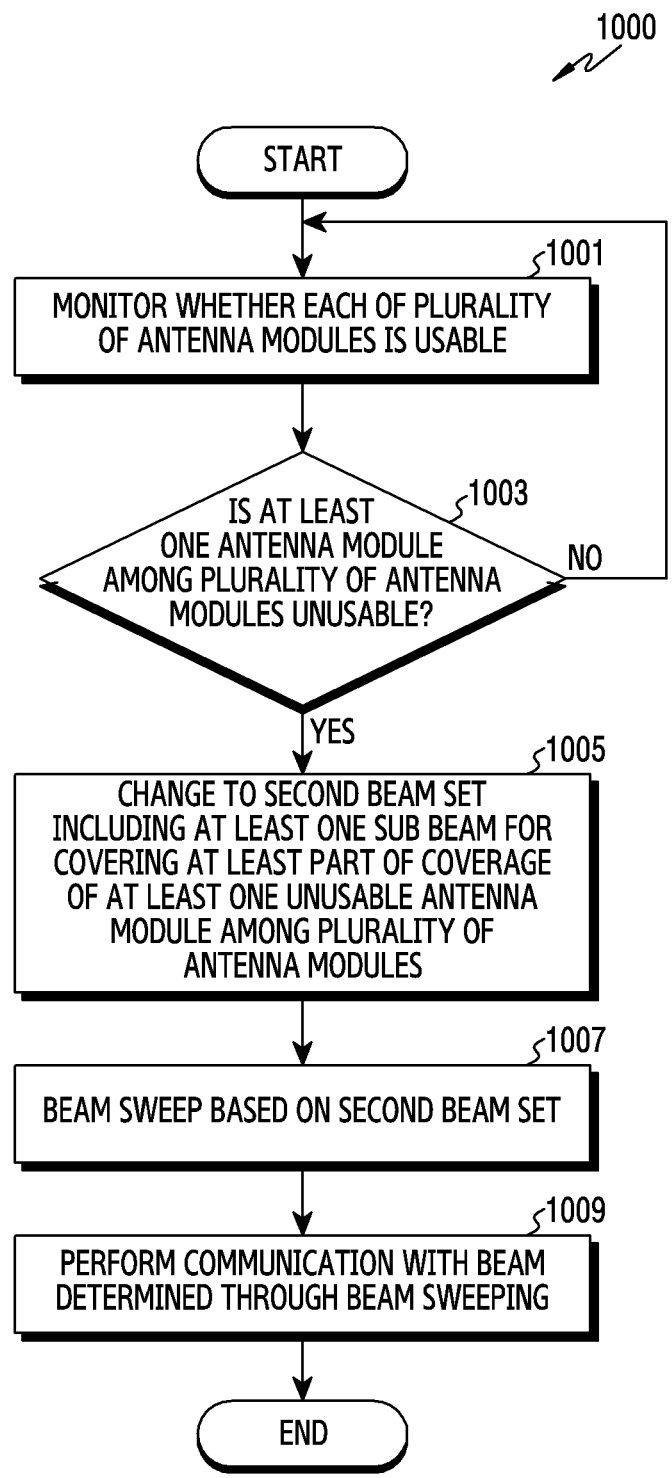
FIG. 10A is a flowchart illustrating an example operation for determining an optimal beam when at least one antenna module is unusable in an electronic device according to various embodiments.
Figure 10B:
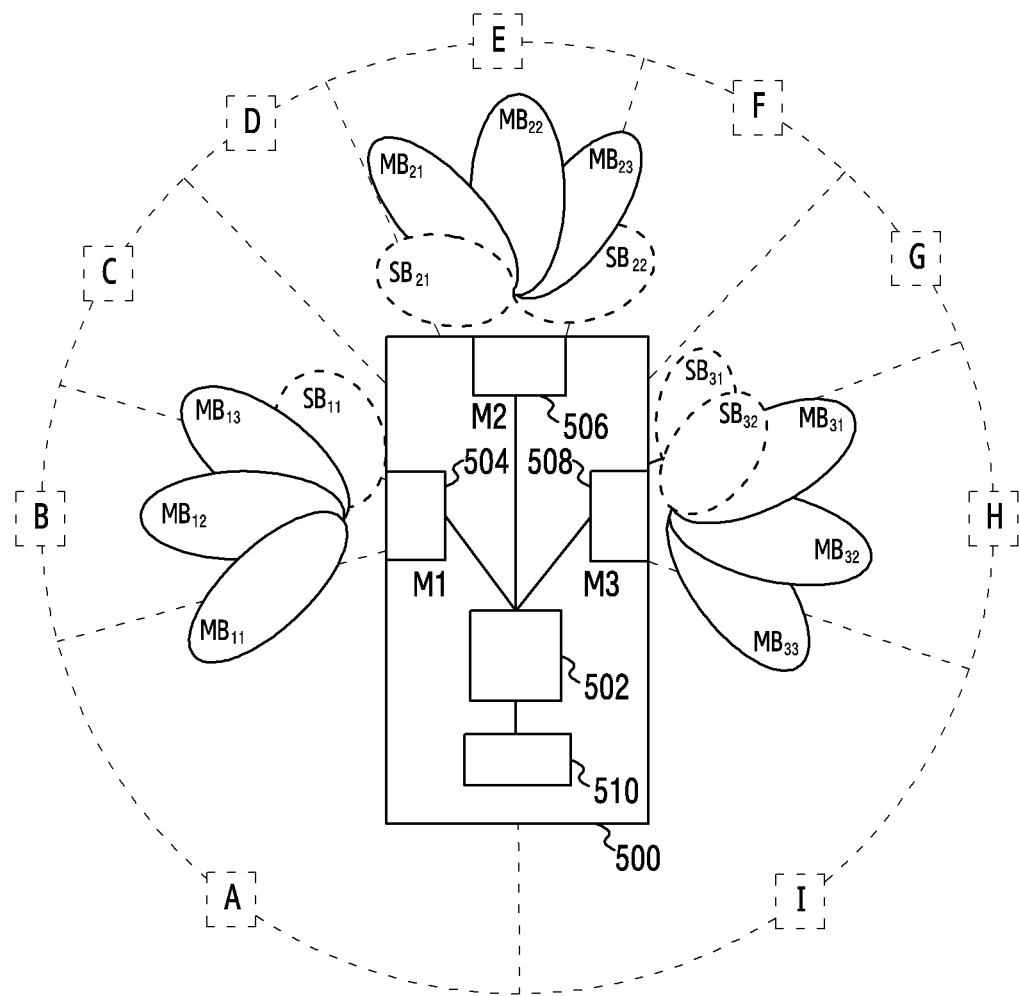
FIG. 10B is a diagram illustrating regions which are covered by main beams and sub beams of a plurality of antenna modules in the electronic device according to various embodiments.

FIG. 10A is a flowchart 1000 illustrating example operations for determining an optimal beam when at least one antenna module is unusable in the electronic device 500 according to various embodiments. FIG. 10B is a diagram illustrating regions covered by main beams and sub beams of the plurality of antenna modules in the electronic device 500 according to various embodiments. Herein, a beam that has a maximum of the EIRP average regarding a specific coverage among a plurality of beams equally supporting the specific coverage may be referred to as a main beam, and the other beams may be referred to as sub beams. An operating entity of the flowchart 1000 illustrated in FIG. 10A may be understood as the electronic device 500 or a component of the electronic device 500 (for example, the processor 502 or the second communication processor 214 of FIG. 2).

Referring to FIG. 10A, in operation 1001, the electronic device 500 according to an embodiment may monitor whether each of the plurality of antenna modules is usable. For example, the electronic device 500 may monitor whether each of the plurality of antenna modules is usable in the middle of performing communication. The electronic device 500 may monitor whether each of the plurality of antenna modules is usable prior to performing communication. The electronic device 500 may receive state information regarding each antenna module from a sensor (for example, the sensor 706 of FIG. 7) included in each of the plurality of antenna modules (for example, the first antenna module 504, the second antenna module 506, the third antenna module 508). The state information may be atmospheric pressure, acceleration, temperature, humidity or illuminance regarding the antenna module. For example, the electronic device 500 may receive information regarding a temperature of the antenna module from the sensor included in each of the plurality of antenna modules.

In various embodiments, when the sensor is included in other components than the antenna module in the electronic device 500 or is included as a separate component in the electronic device 500, the electronic device 500 may receive state information of each of the plurality of antenna modules from the sensor. For example, the electronic device 500 may receive the state information including information regarding a temperature of each of the plurality of antenna modules from the sensor.

According to an embodiment, in operation 1003, the electronic device 500 may determine whether a certain antenna module among the plurality of antenna modules is unusable. For example, the electronic device 500 may determine whether the temperature of each antenna module, received from the sensor (for example, the sensor 706 of FIG. 7), exceeds a predetermined first threshold value. The electronic device 500 may determine at least one antenna module the temperature of which exceeds the predetermined first threshold value as at least one unusable antenna module.

According to an embodiment, when the at least one antenna module is determined as being unusable (Yes in operation 1003), in operation 1005, the electronic device 500 may change a beam set used for current communication from a first beam set of the plurality of antenna modules to a second beam set that includes at least one sub beam to cover at least part of a coverage of the at least one unusable antenna module among the plurality of antenna modules. For example, when the electronic device 500 is allowed to perform communication only within the coverage of the at least one unusable antenna module in the electronic device 500, the coverage may not be covered by the first beam set of the electronic device 500, and accordingly, the electronic device may change the first beam set to the second beam set capable of covering the coverage.

According to an embodiment, when the at least one antenna module is not determined as being unusable (No in operation 1003), the electronic device 500 may monitor whether each of the plurality of antenna modules is usable in operation 1001. For example, the first beam set may be a beam set that is used when all of the plurality of antenna modules in the electronic device 500 are usable, and may be configured as a main beam of each of the plurality of antenna modules. Hereinafter, various embodiments of the operation of changing the first beam set to the second beam set will be described. Information regarding the first beam set may be a beam table in which a value of a beam optimized for the coverage of each antenna module is pre-stored as a phase modulator register value. Information regarding the second beam set may be a beam table in which a value of a beam optimized for a coverage of another antenna module in each antenna module is pre-stored as a phase modulator register value.

TABLE 1

| Antenna module | Coverage | | | | | | | | |
|---|---|---|---|---|---|---|---|---|---|
| | A | B | C | D | E | F | G | H | I |
| M1 | $MB_{11}$ | $MB_{12}$ | $MB_{13}$ | $SB_{11}$ | | | | | |
| M2 | | | | $SB_{21}$ | $MB_{21}$ | $MB_{22}$ | $MB_{23}$ | $SB_{22}$ | |
| M3 | | | | | $SB_{31}$ | $SB_{32}$ | $MB_{31}$ | $MB_{32}$ | $MB_{33}$ |

Referring to FIG. 10B and table 1, each antenna module in the electronic device 500 may have three main beam identifiers (IDs). The electronic device 500 may cover coverages A to C with three main beams $MB_{11}$, $MB_{12}$, $MB_{13}$ of the first antenna module 504 M1, may cover coverages D to F with three main beams $MB_{21}$, $MB_{22}$, $MB_{23}$ of the second antenna module 506 M2, and may cover coverages G to I with three main beams $MB_{31}$, $MB_{32}$, $MB_{33}$ of the third antenna module 508 M3. According to an embodiment, each antenna module in the electronic device 500 may have at least one sub beam ID. The electronic device 500 may cover the coverage C with a sub beam SB 11 of the second antenna module 506, may cover the coverage D with a sub beam $SB_{21}$ of the first antenna module 504, may cover the coverage E with the sub beam $SB_{21}$ of the first antenna module 504 or a sub beam $SB_{31}$ of the third antenna module 508, may cover the coverage F with a sub beam $SB_{32}$ of the third antenna module 508, and may cover the coverage G with a sub beam $SB_{22}$ of the second antenna module 506. The main beam and the sub beam for one antenna module may have different beam directions, and the numbers of main beams and sub beams or beam widths of the main beam and the sub beam are not limited. According to an embodiment, the electronic device 500 may use a beam setting value regarding each beam ID as a phase modulator register value of the antenna module corresponding to the corresponding beam, based on a beamforming schedule, while initiating communication or performing communication.

TABLE 2

| Usable antenna module | Coverage | | | | | | | | |
|---|---|---|---|---|---|---|---|---|---|
| | A | B | C | D | E | F | G | H | I |
| M1, M2, M3 | $MB_{11}$ | $MB_{12}$ | $MB_{13}$ | $MB_{21}$ | $MB_{22}$ | $MB_{23}$ | $MB_{31}$ | $MB_{32}$ | $MB_{33}$ |
| M1, M3 | $MB_{11}$ | $MB_{12}$ | $MB_{13}$ | $SB_{11}$ | $SB_{31}$ | $SB_{32}$ | $MB_{31}$ | $MB_{32}$ | $MB_{33}$ |
| M3 | | | | | $SB_{31}$ | $SB_{32}$ | $MB_{31}$ | $MB_{32}$ | $MB_{33}$ |

Referring to table 2, the first beam set used when all of the first antenna module 504 M1, the second antenna module 506 M2, and the third antenna module 508 M3 are usable according to an embodiment may include the three main beams of the first antenna module 504, the three main beams of the second antenna module 506, and the three main beams of the third antenna module 508, and for example, information regarding the first beam set may be pre-stored in the memory 510 in the form of a beam table. According to an embodiment, when at least one antenna module is determined as being unusable, the electronic device 500 may change the first beam set to the second beam set which includes at least one sub beam capable of covering a coverage of the at least one unusable antenna module. According to an embodiment, when the second antenna module 506 is unusable, the second beam set may include the sub beam $SB_{11}$ of the first module and the sub beams $SB_{31}$, $SB_{32}$ of the third module to cover the coverages D to F of the unusable second antenna module 506. According to an embodiment, when the first antenna module 504 and the second antenna module 506 are unusable, the second beam set may include the sub beams $SB_{31}$, $SB_{32}$ of the third antenna module 508 to cover the coverage E and the coverage F which are at least part of the coverages A to F of the first antenna module 504 and the second antenna module 506, which are unusable. For example, information regarding the second beam set may be pre-stored in the memory 510 in the form of a beam table. According to various embodiments, the number of beams of the second beam set may be smaller than the number of beams of the first beam set, based on the numbers of main beams and sub beams of each antenna module. For example, if each of the four antenna modules has four main beams and one sub beam, the electronic device 500 may use 16 main beams when the four antenna modules are normally operated. When it is identified that one antenna module is unusable, the electronic device 500 may use 12 main beams and 3 sub beams with respect to all of the three antenna modules. The total number of beams used when a normal operation is performed is 16, and the total number of beams used when one antenna module becomes unusable is 15. That is, the number of beams for beam sweeping by the electronic device 500 may be reduced. In various embodiments, the number of beams for beam sweeping may be variable.

According to an embodiment, in operation 1007, the electronic device 500 may perform beam sweeping based on the second beam set. Referring table 2, when the second antenna module 506 M2 in the electronic device 500 is unusable, the electronic device 500 may perform beam sweeping with respect to the sub beam $SB_{11}$ of the first antenna module 504 and the sub beams $SB_{31}$, $SB_{32}$ of the third antenna module 508 to cover the coverages D to F of the second antenna module 506, the main beams $MB_{11}$, $MB_{12}$, $MB_{13}$ of the first antenna module 504, and the main beams $MB_{31}$, $MB_{32}$, $MB_{33}$ of the third antenna module 508, which are the second beam set. According to an embodiment, the electronic device 500 may perform beam sweeping according to each antenna module, or may perform beam sweeping according to a predetermined order regarding an index of each beam.

According to an embodiment, in operation 1009, the electronic device 500 may perform communication with a beam which is determined through beam sweeping. For example, the electronic device 500 may determine a beam having a strongest signal strength by measuring a strength of a base station signal received with each beam through beam sweeping, and may perform communication with the determined beam.

In an embodiment, when the electronic device 500 monitors whether each of the plurality of antenna modules is usable prior to performing communication, the electronic device 500 may perform beam sweeping without using at least one unusable antenna module when beam-sweeping, although this is not illustrated. For example, the electronic device may change the first beam set of the plurality of antenna modules to the second beam set including at least one sub beam to cover at least part of the coverage of the unusable antenna module, and may perform beam sweeping using the second beam set. The electronic device 500 may determine a beam to use for communication based on a result of beam sweeping. The electronic device 500 may monitor whether each of the plurality of antenna modules is usable in the middle of performing communication using the determined beam (for example, operation 1001).

Figure 11:
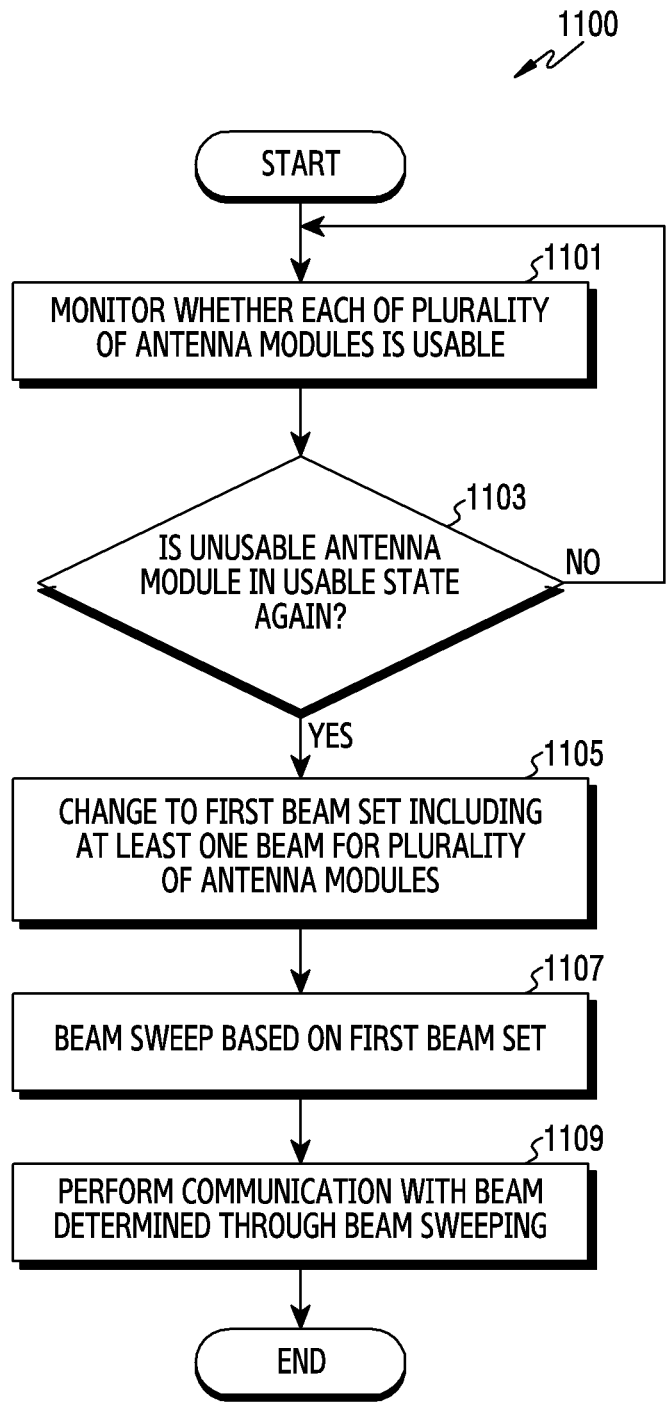
FIG. 11 is a flowchart illustrating an example operation for determining an optimal beam when a plurality of antenna modules become usable in an electronic device according to various embodiments.

FIG. 11 is a flowchart illustrating example operations for determining an optimal beam when the plurality of antenna modules become usable in the electronic device 500 according to various embodiments. An operating entity of the flowchart 1100 illustrated in FIG. 11 may be understood as the electronic device 500 or a component (for example, the processor 502) of the electronic device 500. FIG. 11 illustrates an example of an operation after it is identified that at least one antenna module in the electronic device 500 is unusable.

Referring to FIG. 11, in operation 1101, the electronic device 1100 according to an embodiment may monitor whether each of the plurality of antenna modules is usable. The electronic device 1100 may receive state information regarding each antenna module from a sensor (for example, the sensor 706 of FIG. 7) included in each of the plurality of antenna modules (for example, the first antenna module 504, the second antenna module 506, the third antenna module 508). The state information may be atmospheric pressure, acceleration, temperature, humidity or illuminance information regarding the antenna module. For example, the electronic device 500 may receive information regarding a temperature of the antenna module from the sensor included in each of the plurality of antenna modules.

According to an embodiment, in operation 1103, the electronic device 500 may determine whether an unusable antenna module is in the usable state again. For example, the electronic device 500 may determine whether the temperature of each antenna module received from the sensor (for example, the sensor 706 of FIG. 7) is less than a predetermined second threshold value. The electronic device 500 may determine at least one antenna module the temperature of which is less than the predetermined second threshold value as a usable antenna module. According to an embodiment, the first threshold value for determining an unusable antenna module may be greater than the second threshold value for determining a usable antenna module. According to an embodiment, the electronic device 500 may compare a temperature of a corresponding antenna module and the first threshold value when the corresponding antenna module is a usable antenna module, and may compare a temperature of a corresponding antenna module and the second threshold value when the corresponding antenna module is an unusable antenna module.

According to an embodiment, when it is determined that the unusable antenna module becomes usable again, the electronic device 500 may change the beam set used for current communication from the second beam set to the first beam set including at least one main beam for the plurality of modules in operation 1105. The first beam set may be a beam set that is used when all of the plurality of antenna modules in the electronic device 500 are usable, and may be configured as a main beam of each of the plurality of antenna modules. Information regarding the first beam set may be a beam table in which a value of a beam optimized for a coverage of each antenna module is pre-stored as a phase modulator register value. Referring to table 2, since all of the antenna modules are usable, the first beam set may include three main beams for each of the first antenna module 504 M1, the second antenna module 506 M2, and the third antenna module 508 M3, and information regarding the first beam set may be pre-stored in the memory 510 in the form of a beam table. When the unusable antenna module is not identified as being usable, the electronic device 500 may monitor whether each of the plurality of antenna modules is usable in operation 1101.

According to an embodiment, in operation 1107, the electronic device 500 may perform beam sweeping based on the first beam set. Referring to table 2, the electronic device 500 may perform beam sweeping with respect to the three main beams $MB_{11}$, $MB_{12}$, $MB_{13}$ of the first antenna module 504 M1, the three main beams $MB_{21}$, $MB_{22}$, $MB_{23}$ of the second antenna module 506 M2, and the three main beams $MB_{31}$, $MB_{32}$, $MB_{33}$ of the third antenna module 508 M3, which are the first beam set.

According to an embodiment, in operation 1109, the electronic device 500 may perform communication with a beam determined through beam sweeping. For example, the electronic device 500 may determine a beam of a strongest signal strength by measuring a strength of a base station signal received with each beam through beam sweeping, and may perform communication with the determined beam.

According to various example embodiments, a method of operating an electronic device 500 (for example, the electronic device 101 of FIG. 1) may include: identifying that a first antenna module (for example, the first antenna module 504 of FIG. 5) among a plurality of antenna modules (for example, the first antenna module 504 of FIG. 5, the second antenna module 506 of FIG. 5, the third antenna module 508 of FIG. 5) is unusable; changing a first beam set of the plurality of antenna modules to a second beam set including at least one sub beam to cover at least part of a coverage of the first antenna module; and performing communication based on the second beam set.

According to various example embodiments, the at least one sub beam may include a beam of a usable antenna module among the plurality of antenna modules that covers at least part of the coverage of at least one antenna module identified as being unusable among the plurality of antenna modules.

According to various example embodiments, identifying that the first antenna module among the plurality of antenna modules is unusable may include: receiving information regarding a temperature of each of the plurality of antenna modules from the plurality of antenna modules; and determining whether the temperature of each of the plurality of antenna modules exceeds a specified first threshold value, based on the information regarding the temperature.

According to various example embodiments, the method may further include: identifying that the first antenna module is usable; changing the second beam set to the first beam set; and performing communication based on the first beam set, and the first beam set may be configured as a plurality of main beams for the respective plurality of antenna modules.

According to various example embodiments, identifying that the first antenna module among the plurality of antenna modules is usable may include determining whether a temperature of the first antenna module is less than a specified second threshold value, based on the information regarding the temperature.

According to various example embodiments, the plurality of main beams may have a higher effective isotropic radiated power (EIRP) gain with respect to a specific coverage than the at least one sub beam.

According to various example embodiments, performing communication based on the first beam set may include: performing beam sweeping based on the first beam set; and performing communication using a beam determined based on the beam sweeping.

According to various example embodiments, the first threshold value may be larger than the second threshold value.

According to various example embodiments, performing communication based on the second beam set may include: performing beam sweeping based on the second beam set; and performing communication using a beam determined based on the beam sweeping.

Figure 12:
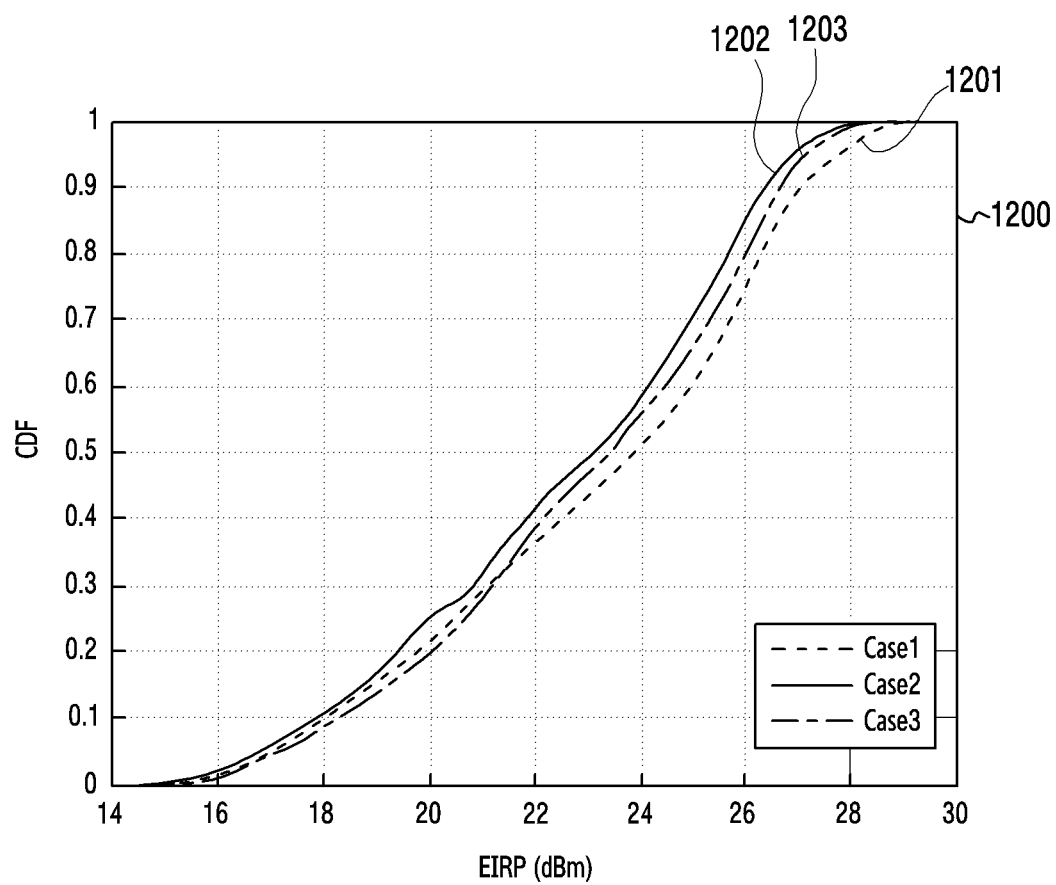
FIG. 12 is a graph illustrating a cumulative distribution function (CDF) regarding effective isotropic radiated power (EIRP) according to different operating methods of an electronic device for controlling a plurality of antenna modules according to various embodiments.
Figure 13A:
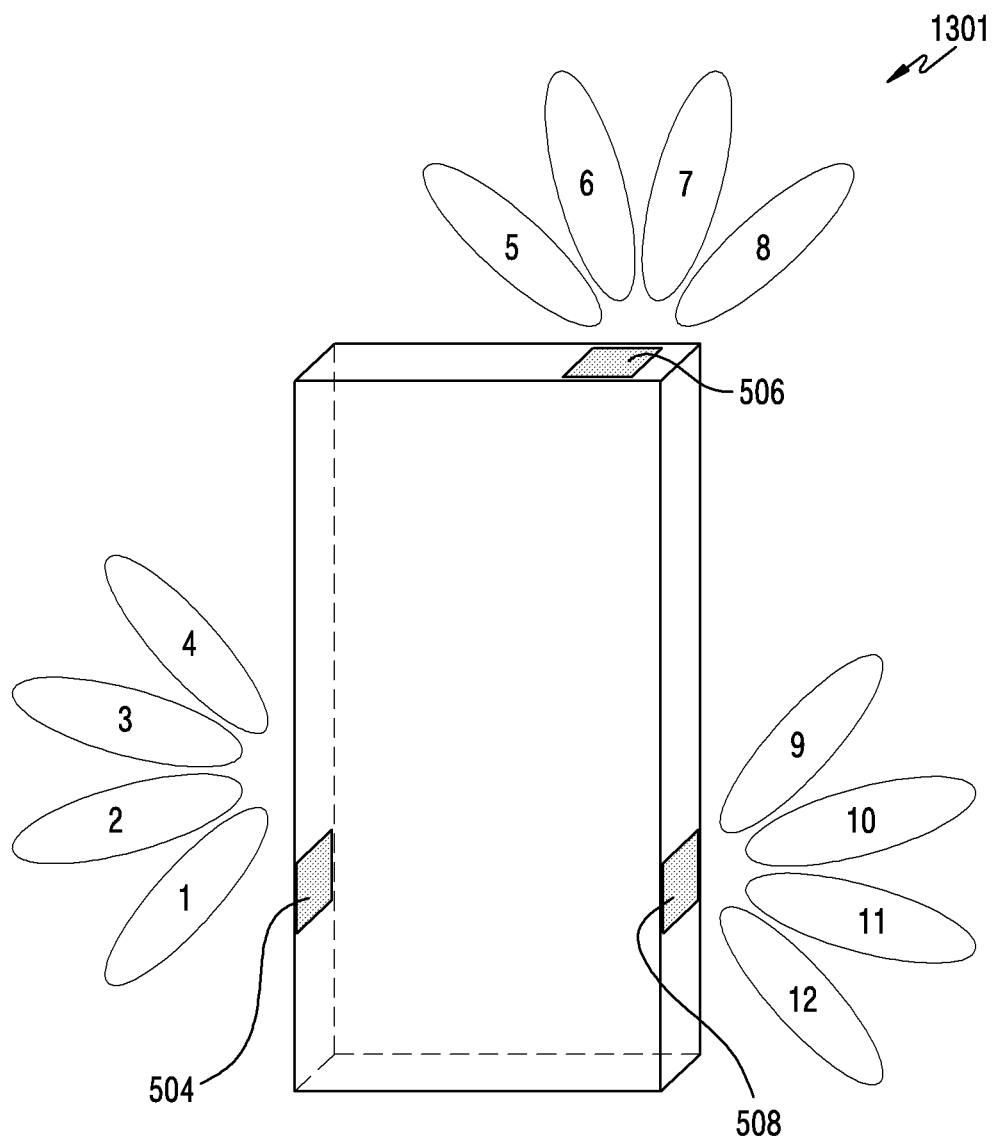
FIG. 13A is a diagram illustrating an example of communication using main beams or sub beams regarding a plurality of antenna modules in an electronic device according to various embodiments.
Figure 13B:
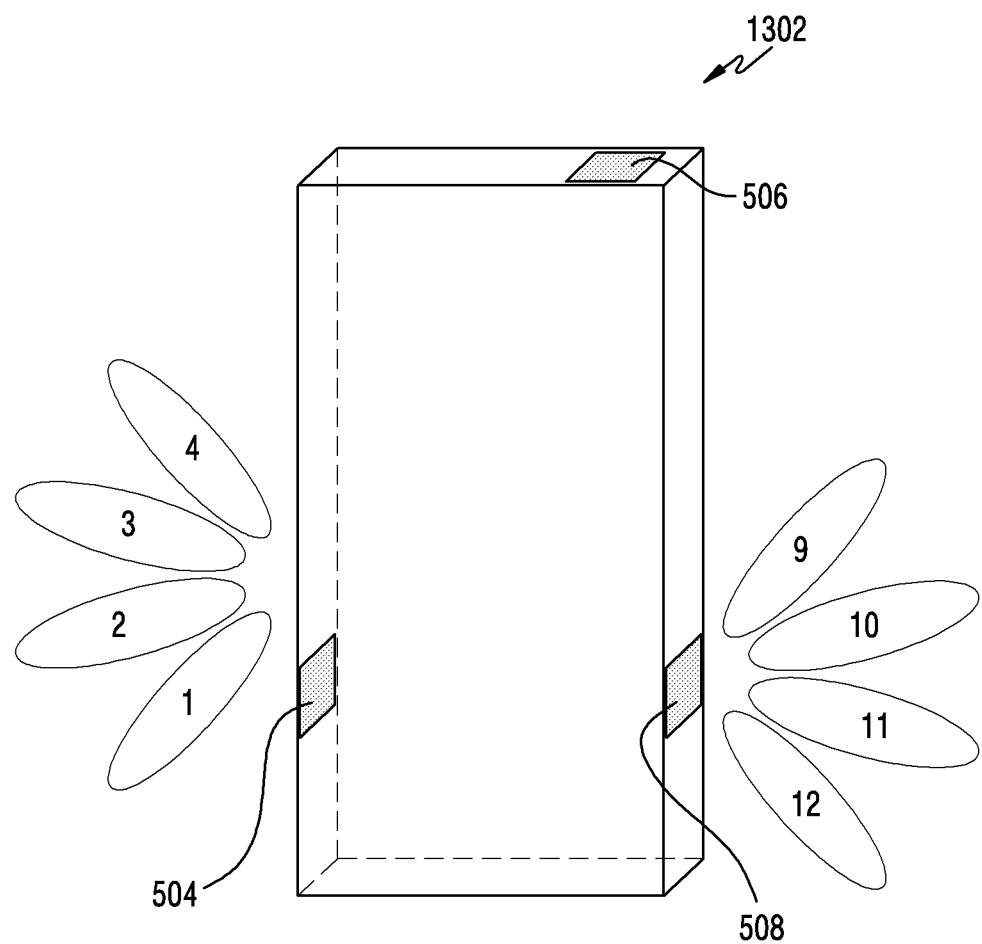
FIG. 13B is a diagram illustrating an example of communicating using main beams or sub beams regarding the plurality of antenna modules in the electronic device according to various embodiments.
Figure 13C:
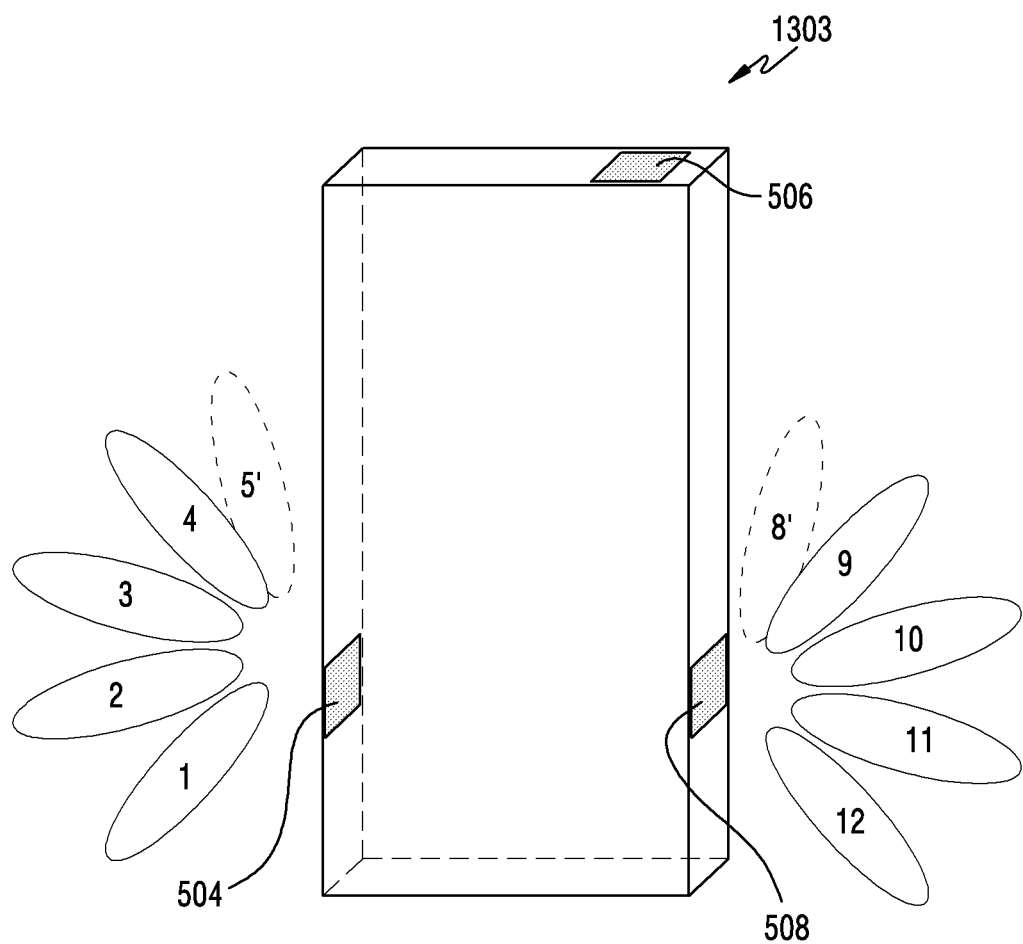
FIG. 13C is a diagram illustrating an example of communicating using main beams or sub beams regarding the plurality of antenna modules in the electronic device according to various embodiments.

FIG. 12 is a graph 1200 illustrating effective isotropic radiated power (EIRP) regarding an entire coverage according to different operating methods of an electronic device controlling a plurality of antenna modules, as a cumulative distribution function (CDF), according to various embodiments. FIGS. 13A, 13B and 13C are diagrams illustrating examples of communicating using a main beam or a sub beam regarding a plurality of antenna modules in an electronic device according to various embodiments.

According to an embodiment, the electronic device 500 may include a first antenna module 504, a second antenna module 506, and a third antenna module 508, and each antenna module may perform communication through four main beams and one sub beam. Referring to FIG. 12, the graph 1200 illustrating the CDF regarding the EIRP may indicate EIRP performance regarding all directions of the electronic device 500. Referring to FIG. 13A, Case 1 1301 is a case where communication is performed through main beams 1 to 12 for the plurality of antenna modules (the first antenna module 504, the second antenna module 506, the third antenna module 508) in the electronic device 500. When all of the plurality of antenna modules are usable, a beam sweeping order may be variable and is not limited. For example, the electronic device 500 may perform beam sweeping according to each antenna module or may perform beam sweeping according to an order predetermined for an index of each beam (see, e.g., graph 1201 of FIG. 12).

Referring to FIG. 13B, Case 2 1302 is a case where communication is performed through main beams 1 to 4 and 9 to 12 for at least one usable antenna module (the first antenna module 504 and the third antenna module 508) when at least one antenna module (the second antenna module 506) is unusable (see, e.g., graph 1202 of FIG. 12).

Referring to FIG. 13C, Case 3 1303 is a case where communication is performed through main beams 1 to 4 and 9 to 12 and sub beams 5', 8' for at least one usable antenna module (the first antenna module 504 and the third antenna module 508) when at least one antenna module (second antenna module 506) is unusable (see, e.g., graph 1203 of FIG. 12). As in Case 2 1302 and Case 3 1303, when at least one antenna module of the plurality of antenna modules is unusable, beam sweeping may be performed without using the at least one unusable antenna module. A beam sweeping order may be variable and is not limited. For example, the electronic device 500 may perform beam sweeping according to each usable antenna module, or may omit the at least one unusable antenna module from a predetermined order for the index of each beam and may perform beam sweeping. Referring to the graph 1300 illustrating the CDF regarding the EIRP, the EIRP at CDF 0.5 and 1 in Case 1301 is higher than that in Case 2 1302 and Case 3 1303, and accordingly, Case 1 supports higher EIRP with respect to an entire coverage compared to Case 2 1302 and Case 3 1303, and Case 3 1303 has higher EIRP in the entire CDF area compared to Case 2 1302, and accordingly, may support higher EIRP with respect to the entire coverage compared to Case 2 1302. Through the graph 1300, it can be seen that additionally managing a sub beam for each antenna module is effective for the electronic device 500.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating an electronic device, the method comprising:
   identifying that a first antenna module among a plurality of antenna modules is unusable;
   changing a first beam set of the plurality of antenna modules to a second beam set including at least one sub beam to cover at least part of a coverage of the first antenna module; and
   performing communication based on the second beam set.

2. The method of claim 1, wherein the at least one sub beam includes a beam of a usable antenna module among the plurality of antenna modules that covers at least part of the coverage of at least one antenna module identified as being unusable among the plurality of antenna modules.

3. The method of claim 1, wherein identifying that the first antenna module among the plurality of antenna modules is unusable includes:
   receiving information of a temperature of each of the plurality of antenna modules from the plurality of antenna modules; and
   determining whether the temperature of each of the plurality of antenna modules exceeds a specified first threshold value, based on the information of the temperature.

4. The method of claim 3, further comprising:
   identifying that the first antenna module is usable;
   changing the second beam set to the first beam set; and
   performing communication based on the first beam set,
   wherein the first beam set is configured as a plurality of main beams of the respective plurality of antenna modules.

5. The method of claim 4, wherein identifying that the first antenna module among the plurality of antenna modules is usable comprises: determining whether a temperature of the first antenna module is less than a specified second threshold value, based on the information of the temperature.

6. The method of claim 5, wherein the first threshold value is greater than the second threshold value.

7. The method of claim 4, wherein the plurality of main beams have a higher effective isotropic radiated power (EIRP) gain with respect to a specific coverage than the at least one sub beam.

8. The method of claim 4, wherein performing communication based on the first beam set comprises:
   performing beam sweeping based on the first beam set; and
   performing communication using a beam determined based on the beam sweeping.

9. The method of claim 1, wherein performing communication based on the second beam set comprises:
   performing beam sweeping based on the second beam set; and
   performing communication using a beam determined based on the beam sweeping.

10. The method of claim 1, wherein the second beam set corresponds to a beam table in which a value of a beam of each of the plurality of antenna modules that is optimized for a coverage of another antenna module is pre-stored.

11. An electronic device comprising:
   a plurality of antenna modules, each including at least one antenna;
   a memory; and
   a processor electrically connected with the plurality of antenna modules and the memory, wherein the processor is configured to:
  identify that a first antenna module among the plurality of antenna modules is unusable;
  change a first beam set of the plurality of antenna modules to a second beam set including at least one sub beam to cover at least part of a coverage of the first antenna module; and
  perform communication based on the second beam set.

12. The electronic device of claim 11, wherein the at least one sub beam includes a beam of a usable antenna module among the plurality of antenna modules that covers at least part of the coverage of at least one antenna module identified as being unusable among the plurality of antenna modules.

13. The electronic device of claim 11, wherein the processor is configured to:
  receive information of a temperature of each of the plurality of antenna modules from the plurality of antenna modules; and
  determine whether the temperature of each of the plurality of antenna modules exceeds a specified first threshold value, based on the information of the temperature.

14. The electronic device of claim 13, wherein the processor is configured to:
  identify that the first antenna module is usable;
  change the second beam set to the first beam set; and
  perform communication based on the first beam set,
  wherein the first beam set is configured as a plurality of main beams of the respective plurality of antenna modules.

15. The electronic device of claim 14, wherein the processor is configured to: determine whether a temperature of the first antenna module is less than a specified second threshold value, based on the information of the temperature.

16. The electronic device of claim 15, wherein the first threshold value is greater than the second threshold value.

17. The electronic device of claim 14, wherein the plurality of main beams have a higher effective isotropic radiated power (EIRP) gain with respect to a specific coverage than the at least one sub beam.

18. The electronic device of claim 14, wherein the processor is configured to:
  perform beam sweeping based on the first beam set; and
  perform communication using a beam determined based on the beam sweeping.

19. The electronic device of claim 11, wherein the processor is configured to:
  perform beam sweeping based on the second beam set; and
  perform communication using a beam determined based on the beam sweeping.

20. The electronic device of claim 11, wherein the second beam set corresponds to a beam table in which a value of a beam of each of the plurality of antenna modules that is optimized for a coverage of another antenna module is pre-stored.

* * * * *